United States Patent
Young et al.

(10) Patent No.: US 7,385,999 B1
(45) Date of Patent: Jun. 10, 2008

(54) HEURISTICS FOR COMBINING INTER-CHANNEL AND INTRA-CHANNEL COMMUNICATIONS IN A WIRELESS COMMUNICATIONS ENVIRONMENT

(75) Inventors: C. David Young, Plano, TX (US); James A. Stevens, Allen, TX (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 969 days.

(21) Appl. No.: 10/689,448

(22) Filed: Oct. 20, 2003

(51) Int. Cl.
*H04J 3/26* (2006.01)

(52) U.S. Cl. .............. 370/432; 370/443; 370/458; 370/462

(58) Field of Classification Search .......... 370/443, 370/458, 227–436
See application file for complete search history.

(56) References Cited

U.S. PATENT DOCUMENTS

| | | | |
|---|---|---|---|
| 4,763,322 A | 8/1988 | Eizenhofer | 370/337 |
| 4,982,430 A * | 1/1991 | Frezza et al. | 380/211 |
| 5,117,422 A | 5/1992 | Hauptschein et al. | 370/255 |
| 5,245,609 A | 9/1993 | Ofek et al. | 370/348 |
| 5,420,858 A | 5/1995 | Marshall et al. | 370/352 |
| 5,448,698 A | 9/1995 | Wilkes | 395/200.01 |
| 5,450,394 A | 9/1995 | Gruber et al. | 370/17 |
| 5,457,681 A | 10/1995 | Gaddis et al. | 370/402 |
| 5,502,722 A | 3/1996 | Fulghum | 370/69 |
| 5,506,848 A | 4/1996 | Drakopolous et al. | 370/336 |
| 5,568,477 A | 10/1996 | Galand et al. | 370/60 |
| 5,581,548 A | 12/1996 | Ugland et al. | 370/330 |
| 5,598,417 A | 1/1997 | Crisler et al. | 370/348 |
| 5,625,629 A | 4/1997 | Wenk | 370/330 |
| 5,652,751 A | 7/1997 | Sharony | 340/2.4 |
| 5,696,903 A | 12/1997 | Mahany | 709/228 |
| 5,719,868 A | 2/1998 | Young | 370/436 |
| 5,742,593 A | 4/1998 | Sharony et al. | 370/347 |
| 5,748,362 A | 5/1998 | Delacourt et al. | 359/326 |
| 5,920,703 A | 7/1999 | Campbell et al. | 709/236 |
| 5,949,760 A | 9/1999 | Stevens et al. | 370/280 |

(Continued)

OTHER PUBLICATIONS

Young, "USAP: A Unifying Dynamic Distributed Multichannel TDMA Slot Assignment Protocol," Proc. IEEE MILCOM 1996, vol. 1, Oct. 1996.

(Continued)

*Primary Examiner*—Seema S. Rao
*Assistant Examiner*—Wanda Z Russell
(74) *Attorney, Agent, or Firm*—Nathan O. Jensen; Kyle Eppele

(57) ABSTRACT

A method of communicating over a network of nodes using a plurality of broadcast channels. Each channel facilitates the transmission and reception of data during cycles of time divided into discrete time frames. Each frame is divided into a plurality of slots. Each node in the network is configured to broadcast, to other nodes within one hop of said node, on a common bootstrap channel during a first bootstrap slot, slot assignment information relating to any of the broadcast channels. Each node is assigned to communicate over a broadcast channel that is one of the plurality of broadcast channels. Each node broadcasts, on its assigned channel during a second bootstrap slot, slot assignment information relating to the assigned broadcast channel to other nodes within one hop of said node and on said assigned channel. Each node communicates according to the slot assignment information.

20 Claims, 5 Drawing Sheets

U.S. PATENT DOCUMENTS

| | | | | |
|---|---|---|---|---|
| 5,953,344 | A | 9/1999 | Dail et al. | 370/337 |
| 5,983,259 | A | 11/1999 | Campbell et al. | 709/200 |
| 6,018,528 | A | 1/2000 | Gitlin et al. | 370/436 |
| 6,031,827 | A | 2/2000 | Rikkinen et al. | 370/330 |
| 6,084,888 | A | 7/2000 | Watanabe et al. | 370/473 |
| 6,084,889 | A | 7/2000 | Murakami | 370/474 |
| 6,094,429 | A | 7/2000 | Blanchette et al. | 370/337 |
| 6,157,656 | A | 12/2000 | Lindgren et al. | 370/458 |
| 6,252,868 | B1 | 6/2001 | Diachina et al. | 370/347 |
| 6,275,506 | B1 | 8/2001 | Fazel et al. | 370/459 |
| 6,304,559 | B1 | 10/2001 | Jacklin et al. | 370/310 |
| 6,310,867 | B1 | 10/2001 | Tat et al. | 370/254 |
| 6,314,084 | B1 | 11/2001 | Kahale et al. | 370/230 |
| 6,317,436 | B1 * | 11/2001 | Young et al. | 370/443 |
| 6,324,184 | B1 | 11/2001 | Hou et al. | 340/7.43 |
| 6,331,973 | B1 | 12/2001 | Young et al. | 370/337 |
| 6,353,605 | B1 | 3/2002 | Rautanen et al. | 370/337 |
| 6,487,186 | B1 | 11/2002 | Young et al. | 370/336 |
| 6,504,829 | B1 | 1/2003 | Young et al. | 370/337 |
| 6,574,199 | B1 | 6/2003 | Young et al. | 370/254 |
| 6,574,206 | B2 | 6/2003 | Young | 370/337 |
| 6,600,754 | B1 | 7/2003 | Young et al. | 370/459 |
| 6,628,636 | B1 | 9/2003 | Young | 370/337 |
| 2002/0001294 | A1 | 1/2002 | Amouris | 370/337 |
| 2002/0046381 | A1 | 4/2002 | Morris et al. | 714/752 |

OTHER PUBLICATIONS

L. Pond and V. Li, "Bridging the Gap Interoperability, Survivability, Security," 1989 IEEE MILCOM, Conference Record, vol. 1 of 3.

Bittle, Caples, Young, "Soldier Phone: An Innovative Approach to Wireless Multimedia Communications," 1998 IEEE MILCOM, vol. 3.

IEEE Transaction on Information Theory, vol. IT-30, No. 4, Jul. 1984.

Sunlin, "A Hybrid Distributed Slot Assignment TDMA Channel Access Protocol," IEEE Military Communications Conference, 1990, vol. 3 of 3.

Young and Stevens, "Clique Activation Multiple Access (CAMA): A Distributed Heuristic for Building Wireless Datagram Networks," IEEE Military Communications Conference 1998, vol. 1.

Ju et al. "An Optimal Topology-Transport Scheduling Method in Multihop Packet Radio Networks." IEEE/ACM Transactions on Networking. Jun. 1998. pp. 298-306.

Chakraborty et al. "Generic Algorithm for Broadcast Scheduling in Packet Radio Networks," Evolutionary Computation Proceedings, 1998. IEEE World Congress on Computational Intelligence. May 4-9, 1998. pp. 183-188.

Pond et al. "A Distributed Time-Slot Assignment Protocol for Mobile Multi-Hop Broadcast Packet Radio Networks," IEEE MILCOM, 1989. Oct. 1989. pp. 70-74.

Chou et al. "Slot Allocation Strategies for TDMA Protocols in Multihop Packet Radio Network." Eleventh Annual Joint Conference of the IEEE Computer and Communications Societies. May 4-8, 1992. pp. 710-716.

Oono et al. "Dynamic Slot Allocation Technology for Mobile Multi-Media TDMA Systems Using Distributed Control Scheme," IEEE. Oct. 12-16, 1997. pp. 74-78.

U.S. Appl. No. 09/650,332, "Scheduling Techniques for Receiver Directed Broadcast Applications," filed Aug. 29, 2000, C. David Young.

U.S. Appl. No. 09/562,549, "Efficient Grouping of Control and User Data," filed May 2, 2000, J.A. Stevens et al.

U.S. Appl. No. 09/303,802, "Clique Activation Multiple Access," filed Apr. 30, 1999, C. D. Young et al.

U.S. Appl. No. 09/649,666, "Full Duplex Communication Slot Assignment," filed Aug. 29, 2000, C. David Young.

U.S. Appl. No. 09/422,498, "Method and Apparatus for Managing Communication Resources Using Dynamic and Static Assignment of Communication Slots," filed Oct. 21, 1999, C. David Young.

U.S. Appl. No. 09/340,881, "A Method and Apparatus for Managing Communication Resources Using Frame Fitting," filed Jun. 28, 1999, C. David Young.

U.S. Appl. No. 09/649,802, "Maintaining an Adaptive Broadcast Channel Using Both Transmitter Directed and Receiver Directed Broadcast," filed Aug. 29, 2000, C. David Young.

U.S. Appl. No. 09/552,144, "Method and Apparatus for Assigning Receive Slots in a Dynamic Assignment Environment," filed Apr. 19, 2000, C. D. Young. et al.

U.S. Appl. No. 09/649,665, "Data Communication Techniques for Real Time Data Transmission," filed Aug. 29, 2000, T. Golubiewski et al.

* cited by examiner

HEURISTICS FOR COMBINING INTER-CHANNEL AND INTRA-CHANNEL COMMUNICATIONS IN A WIRELESS COMMUNICATIONS ENVIRONMENT

STATEMENT REGARDING FEDERALLY SPONSORED RESEARCH OR DEVELOPMENT

The invention was made with U.S. Government support under contract no. DMB07-02-C-C403 and the U.S. Government has certain rights in this invention.

FIELD OF THE INVENTION

The invention relates to communications, and more particularly, to a system and method for communicating over a wireless network.

BACKGROUND OF THE INVENTION

Wireless communications networks have found great utility in many commercial and military applications. However, some types of wireless networks become less efficient in transmitting information when a large number of nodes are attempting to communicate thereon.

Previous efforts to increase the efficiency of a wireless network have included the following, all of which are assigned to the same entity as the present application and which are incorporated by reference herein in their entirety:

U.S. Pat. No. 5,949,760, entitled "Simultaneous Channel Access Transmission Method and a Multi-Hop Communications Radio Network";

U.S. Pat. No. 5,719,868, titled "Dynamic Distributed, Multi-Channel Time Division Multiple Access Slot Assignment Method for a Network of Nodes";

U.S. Pat. No. 6,487,186, titled "A Method and Apparatus for Managing Communication Resources Using Bootstrap Slots";

U.S. Pat. No. 6,504,829, titled "A Method and Apparatus for Managing Communication Resources Using Channelized Neighborhoods";

U.S. Pat. No. 6,628,636, titled "A Method and Apparatus for Managing Communication Resources Using Neighbor Segregation";

U.S. Pat. No. 6,317,436, titled "A Method and Apparatus for Managing Communication Resources Using an Adaptive Broadcast Cycle (ABC)";

U.S. Pat. No. 6,331,973, titled "Unifying Slot Assignment Protocol Multiple Access System";

U.S. Pat. No. 6,574,206, titled "A Method and Apparatus for Managing Communication Resources Using Speculation Slots";

U.S. Pat. No. 6,600,754, titled "A Method and Apparatus for Managing Communication Resources Using Standby Slots"; and U.S. Pat. No. 6,574,199, titled "Unifying Slot Assignment Protocol Logical Neighborhooding".

One way of dealing with high network density is to segregate groups of nodes onto separate channels, thereby reducing the number of nodes that need to share any one channel. Another reason to isolate a group of nodes on a separate channel is for exchanging routine communications in support of a common mission. In either case, it is challenging to coordinate communications between nodes of different channels.

It is therefore an object of the invention to provide a communications network that efficiently manages a large number of nodes.

It is another object of the invention to provide a communications network that efficiently manages a plurality of nodes on a plurality of channels.

It is a further object of the invention to provide such a communications network that effectively coordinates communications between nodes on different channels.

A feature of the invention is the use of bootstrap slots on a common channel to coordinate inter-channel coordination, and an additional series of bootstrap slots on each channel, broadcast to nodes within one hop of a broadcast node, to coordinate intra-channel communications.

An advantage of the invention is the easy incorporation of heuristics to increase the efficiency of communications in a wireless network.

SUMMARY OF THE INVENTION

The invention provides a method of communicating over a network of nodes using a plurality of broadcast channels. Each channel is configured to facilitate the transmission and reception of data during cycles of time. Each cycle of time is divided into discrete time frames. Each frame is divided into a plurality of slots. One of the plurality of broadcast channels is designated as a common bootstrap channel. Each node in the network is configured to broadcast, to other nodes within one hop of said node, on the common bootstrap channel during a first bootstrap slot, slot assignment information relating to any of the plurality of broadcast channels. Each node is assigned to communicate over a broadcast channel that is one of the plurality of broadcast channels. Each node broadcasts, on its assigned channel during a second dynamically assigned bootstrap slot, slot assignment information relating to the assigned broadcast channel to other nodes within one hop of said node and on said assigned channel. Each node communicates according to the slot assignment information.

The invention also provides a method of connecting communications nodes to a wireless communications network. One of a plurality of communications channels is designated as a common bootstrap channel. Each node in the network is configured to broadcast, on the common bootstrap channel during a first time period, information to nodes, within one hop of said node, on any of the plurality of communications channels. Each node is assigned to communicate over a communications channel that is one of the plurality of communications channels. Each node broadcasts, on its assigned channel during an allocation in a second time period, slot assignment information relating to the assigned broadcast channel to other nodes that are also assigned to said assigned broadcast channel and that are within one hop of said node. Each node communicates on its assigned channel according to the slot assignment information.

The invention further provides a wireless communications network, including a plurality of TDMA communications channels. One of the channels is a common channel. Each of a plurality of nodes are assigned to one of the channels. A repeating time cycle is divided into a plurality of frames. A first plurality of bootstrap slots is provided for communicating on the common channel. All of the plurality of nodes receive slot allocation information from the first plurality of bootstrap slots. A second plurality of bootstrap slots, distributed across all the channels is also provided.

Each node receives slot allocation information from other nodes that are within one hop of said node and on the same assigned channel.

DETAILED DESCRIPTION OF THE DRAWINGS

To resolve the above mentioned challenges of communications over a highly dense network, a technique has been invented which uses a structure of bootstrap slots and standby broadcast/reservation slots with a combination of heuristics to enhance communications on each of a plurality of channels while allowing reservations to be established as needed between any of the channels. The invention further minimizes the time spent by any particular node on a common control channel. As further developed herein, the heuristics may include the following: dynamic assignment of CNi bootstrap slots and Rotating Broadcast Slots with 3-hop constraints, the dynamic assignment of Fixed Reservation Slots, Yielding and Loaning Broadcast Slots, and Advantaged Nodes.

Figure 1:
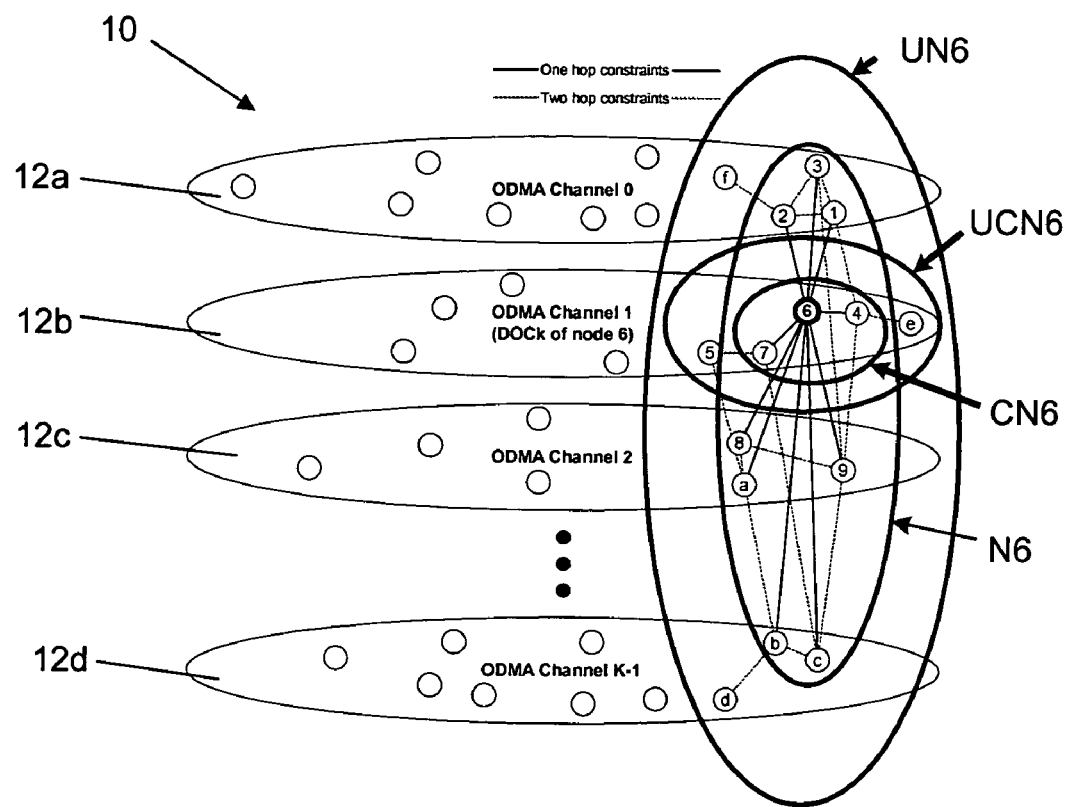
FIG. 1 is a schematic diagram of a communications network.

FIG. 1 depicts a plurality of nodes arranged in a communication network indicated generally by reference number 10. The nodes in network 10 are shown as being arranged in or assigned to one of a plurality of ODMA (Orthogonal Domain Multiple Access) channels 12a, 12b, 12c, 12d. An ODMA Channel is what is managed to achieve simultaneous transmissions among neighboring nodes in the same Time Domain Multiple Access (TDMA) slot. Each node chooses a Default ODMA Channel k (DOCk) to facilitate communications with other nodes which have chosen the same DOCk. Each node i has a neighborhood Ni, which is the set of 1-hop neighbors of node i on all ODMA channels. Ni is unique to node i and is able to span the ODMA channels because the Ni bootstraps are monitored by all of its neighbors regardless of their DOCk. For example, the neighborhood of node 6 is identified as N6 and includes nodes 1, 2, 3, 4, 7, 8, 9, a, b, and c.

Each node i also has a USAP Neighborhood UNi, which is defined as the unique set of neighbors of node i and the neighbors of these neighbors (all nodes within 2 hops of a node i) on all ODMA channels. The subset of UNi that is 2 hops away on other DOCks is visible to i only in terms of USAP constraints, not node IDs. UNi is unique to node i and is able to span the ODMA channels because the bootstraps are monitored by all of its neighbors regardless of their DOCk. For example, the USAP neighborhood of node 6 is identified as UN6 and includes nodes 1, 2, 3, 4, 5, 7, 8, 9, a, b, c, d, e, and f.

Each node i also has a Channel Neighborhood CNi, which is defined as the set of 1-hop neighbors of node i sharing the same DOCk as i. In other words, a CNi is the subset of UNi that are direct neighbors of node i sharing the same DOCk as i. By sharing the same DOCk, node i can transmit to members of CNi using its rotating broadcast slots. The Channel neighborhood of node 6 is identified as CN6 and includes nodes 4 and 7.

Each node i further has a USAP Channel Neighborhood UCNi, which is defined as the set of neighbors of node i and the neighbors of these neighbors (all nodes within 2 hops of a node i) sharing the same DOCk as node i. All nodes within the UCNi are visible to node i both in terms of the USAP constraints from bootstrap packets and node IDs from monitor packets. The USAP channel neighborhood of node 6 is identified as UCN6 and includes nodes 4, 5, 7, and e.

Figure 2:
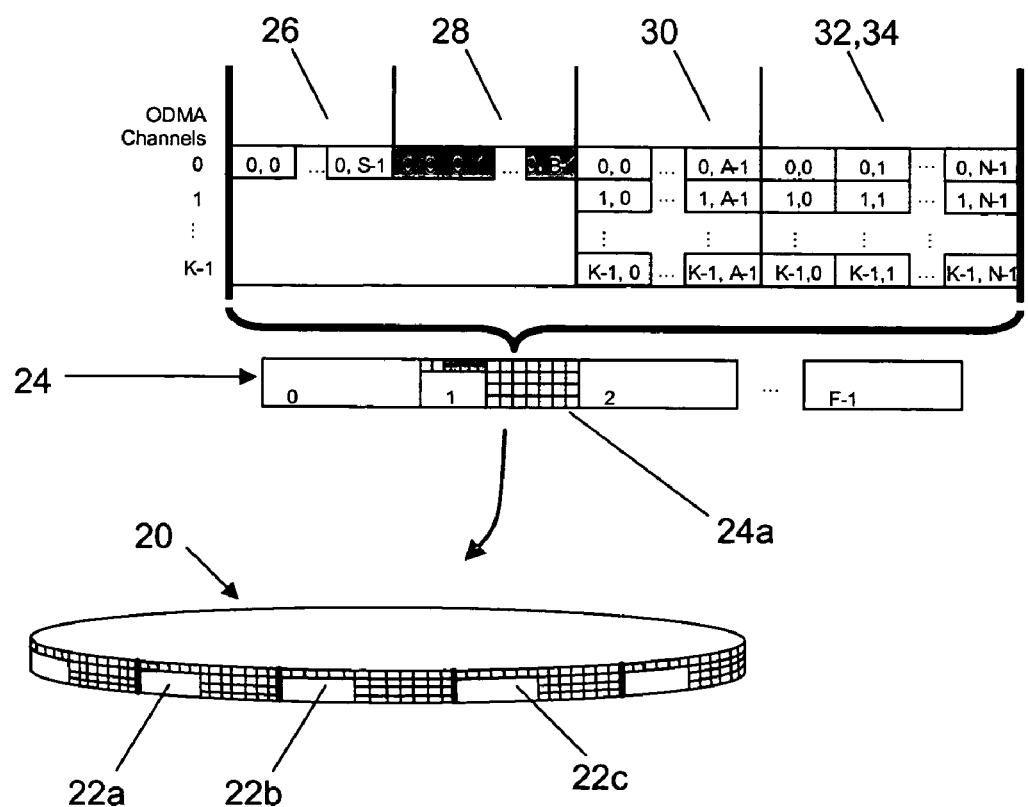
FIG. 2 is a schematic diagram of a multi-channel broadcast cycle.

FIG. 2 depicts an ODMA cycle 20 comprising a series of consecutively occurring and cyclically repeating frames, of which frames 22a, 22b, and 22c are exemplary. The frames are shown in linear form at 24. Each frame is subdivided into a plurality of slots, as shown with frame 24a. There are several types of slots in each frame. For instance, synchronization (sync) slots 26 are used to convey information needed to allow partitioned networks to merge as specified by time synchronization protocols. Ni bootstrap (NiB) slots 28 are used to transmit low rate common channel bootstrap data containing USAP information for allocating fixed reservation slots. NiB slots 28 are transmitted on a common channel and are received by all neighbors of a broadcasting node. Each NiB slot is pre-assigned and unique to every node in the network. A Ni Bootstrap Slot Position of node i (NSPi) corresponds to the unique slot within the Ni bootstrap cycle that node i has been assigned to transmit its Ni bootstrap. A Ni Bootstrap Slot Position of node j as known by node i (NSPj) is the NSP that node i knows about other nodes j. The correspondence between the NSPj and node IDs is loaded along with other configuration information, making the NSPj a more efficient means of addressing transmissions to specific neighbors without using full node IDs.

Each frame also includes one or more CNi Bootstrap (CNiB) slots 30, which is where the higher rate channel bootstrap is transmitted containing USAP information for assigning CNiB slots and RBSs. CNiB slots are received by neighbors of a node within the CNi. The CNi bootstrap slot is assigned dynamically and bears no relationship to the NSPi, which is assigned statically during configuration.

A Rotating Broadcast Slot (RBS) 32 is used for node activation. If reserved via the CNiB, RBS 32 provides contentionless access for a single node within UCNi. Outside of UCNi the RBS can be reused. The RBS also provides contention access if not reserved or if reserved and the owner indicates that it will not transmit in it in the near future, which will be discussed more fully herein with respect to slot headers. The RBS is also staggered from one frame to the next to minimize the impact on any one node when a Fixed Reservation Slot is assigned (which takes precedence over an RBS occurring in the same frame).

Fixed Reservation Slots (FRS) 32 are used for link or node activation. If reserved via the NiB it provides contentionless access for a single node within UNi. Outside of UNi it can be reused. The FRS is repeated in the same slot in each frame and replaces an RBS that may occur in the same frame. It is primarily intended for communications between ODMA channels but could also be assigned between nodes on the same DOCk.

As stated above, Rotating Broadcast Slots and Fixed Reservation Slots provide a means for contentionless access. For the purposes of this disclosure, contention or contention access occurs when more than a single node attempts to transmit in an unreserved slot or in a reserved slot that is not currently being used for transmission by its owner. If more than one node in a neighborhood actually transmits in a contended slot there is a chance that their transmissions may collide at the intended receiver(s), thereby preventing them from being received correctly. To reduce the chance of collision each of the contending transmitters may use a pseudorandom delay to determine whether it actually transmits in any given contention slot. The use of RBS and FRS provide another way to reduce the chance of message collision.

Figure 3:
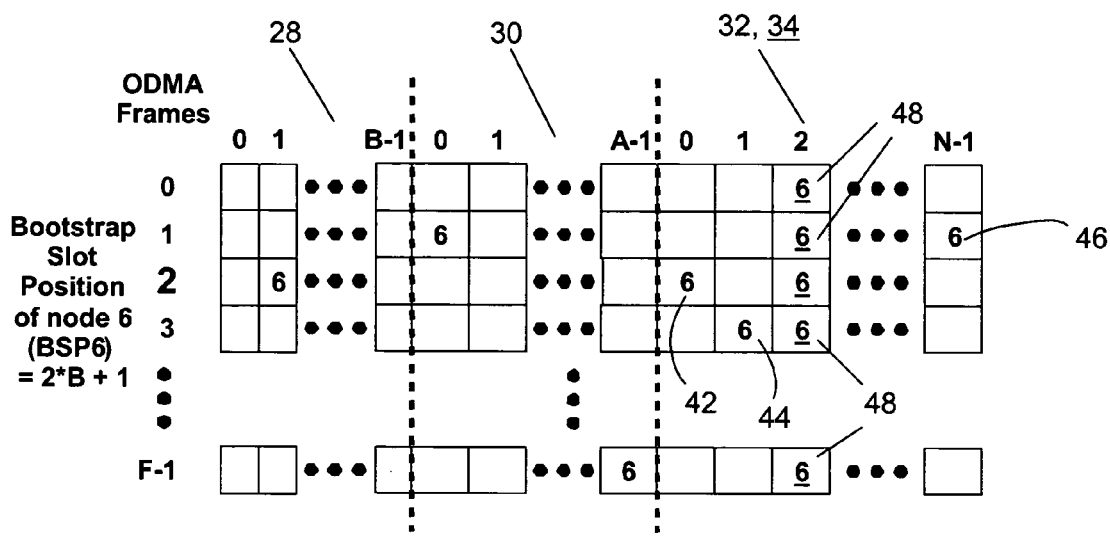
FIG. 3 is a chart showing slot assignments for multiple time frames on a single communications channel.

The different types of slots are shown in FIG. 3, which depicts slots in a single channel during consecutive frames. Node 6 uses NiB slot 1 during frame 2. Node 6 uses CNiB slot 0 during frame 1 and CNiB slot A-1 during frame F-1. Node 6 has also been assigned staggered Rotating Broadcast Slots 42, 44, 46. Node 6 further is using slot 2 during all frames to transmit using Fixed Reservation Slots 48. Note that the Fixed Reservation Slots take precedence over Rotating Broadcast Slots.

While the sync and bootstrap slots are on a common (pseudo-randomized) channel, such as channel 0 in FIG. 2, the rest of the slots occur in multiple channels of the ODMA frame. These are used for RBS and FRS on an ODMA channel to carry routine traffic between nodes on that channel. In addition, they can be assigned on other channels for enhanced communications between channels.

The sync slots are just large enough to accommodate the smallest amount of information needed to allow partitioned networks to merge. The number of these slots determines how quickly they can merge. The Ni and CNi bootstrap slots are just large enough to hold an Ni or CNi bootstrap packet, respectively. The remaining slots fill the rest of the frame. Their number factors into the broadcast cycle, the maximum number of nodes that can perform a rotating broadcast in a single frame, and their size determines the maximum amount of information in a single transmission. Their number and size combine to determine the frame latency.

The data typically transmitted during a bootstrap slot comprises a bootstrap packet. The two types of bootstrap packets, i.e., NiB and CNiB, are used for spreading different types of USAP information. For example, the NiB packet is transmitted in the preassigned Ni bootstrap slot. It is used for assigning reservations between nodes on different ODMA channels. It uses USAP information to reserve FRS slots. These slots repeat on the selected channel in every frame for increased bandwidth between nodes that may or may not have the same DOCk. Each NiB contains the following information:

a node's ID. Neighbors of the node record the association of this node ID with the NiB slot.
   Whether the node is an advantaged node or not. A node that is advertising itself as advantaged would cause its non-advantaged neighbors to treat it as described further herein.
   Which DOCk and CNiB have been chosen by the node. This information helps nodes detect when they or their neighbors have unluckily chosen the same CNiB.
   An Ni nodality metric so that a node entering the network would aid in knowing how much randomization to use on NiB contention slots. This would allow the new node to establish itself quicker than waiting for an entire NiB cycle.
   USAP information to reserve FRSs. These slots repeat on the selected channel in every frame for increased bandwidth between nodes that may or may not have the same DOCk.

The CNiB packet is transmitted in the CNi bootstrap slot. It is used for assigning CNiB slots and RBSs between nodes on the same ODMA channel. It uses USAP information to assign CNiB slots. It also uses USAP information to assign RBSs, which repeat on the selected channel according to the staggered RBS schedule for increased bandwidth between nodes that have the same DOCk. Each CNiB may contain the following information:

a node's ID.
   A CNi nodality metric so that a node entering the network would aid in knowing how much randomization to use on CNiB and RBS contention slots. This would allow the new node to establish itself quicker than waiting for an entire CNiB cycle.
   USAP information to reserve CNiB slots. These slots repeat every CNiB cycle. A node that wishes to reserve a RBS slot can reserve a CNiB slot so that USAP can advertise the constraints consistently.
   USAP information to reserve RBS slots. These slots repeat every frame except that they are shifted by one slot until they arrive at their original position every RBS cycle.

The NiB is transmitted on a common channel so that it can be heard by all neighbors of i. It contains USAP information for reserving FRSs. The CNiB is transmitted concurrently by all nodes using the same slot on their assigned DOCks. Thus it is intended only for neighbors of node i on the same DOCk and contains USAP information for assigning CNiB slots and RBSs.

Each type of bootstrap has its own cycle. The NiB cycle is relatively long so that it is most suitable for long-lived, stable reservations. This is intended for maintaining unicast communications between DOCks. The CNiB cycle on the other hand is as short as possible to minimize latency in response to surges of bursty traffic within a DOCk. The shorter cycle is possible because the nodes of one DOCk are transmitting the CNiBs concurrently with the nodes of other DOCks.

Because the NiB cycle is relatively long, it is useful to have some additional NiB slots that are used on a contention basis. NiBs are the vehicle for assigning FRSs between DOCks and are used on relatively stable, long-lived links. To decrease the latency in initially assigning the slots, the contention slots are used. In other words, if the scheduled NiB slot is not close in time, the assignment is first announced in a NiB contention slot to get it established and after that just in the NiB scheduled slot for maintenance.

Because the CNiB slots are assigned dynamically, a large pool of them should be available for stability. This allows a denser neighborhood, especially when 3-hop reuse is in effect, as further described herein. Also, additional slots allow contention access to reduce the latency of nodes trying to set up reservations for longer term sessions. The number of CNiB slots should also be great enough to allow each DOCk member to assign itself a slot for the case of uniform traffic. This allows for a graceful degradation of service without excluding nodes from the network.

The dynamic assignment of CNiB slots also opens the possibility of conflicting assignments. This is the reason that the CNiB of a node is listed in its NiB. If the conflicting assignments are for direct neighbors then the direct neighbors should recognize the conflict by hearing each other's NiBs announcing the same CNiB on the same DOCk. A conflict will also be declared if there is an intervening neighbor that, recognizing that both of these nodes are reporting the same CNiB slots in their NiBs. In this case the CNiB is being reused after only 2 hops and a conflict will be declared.

To join a neighborhood, a node advertises its DOCk in the NiB. As part of the neighborhood, the node does one or more of the following:

The node assigns a CNi bootstrap slot and RBS(s) as required by its traffic needs.

The node increases its transmission capacity in the DOCk by reserving RBSs. It can also add a link to another DOCk with an FRS via the NiB.

A node with an assigned RBS transmits monitor packets, which contain lists of neighbors and other information to be shared with neighbors on the same DOCk, and traffic to its neighbors on the same DOCk.

Without an assigned RBS the monitor packets and traffic are transmitted much less frequently using loaned RBSs or contention on unused or yielded RBSs.

Once a node starts transmitting, its neighbors measure its received link qualities. They in turn feed back the received link metrics back to the transmitters using the monitor packets. These are then used to adapt transmission parameters.

A transmission fits within the boundaries of the type of slot for which it is intended. The transmission is built up of cells whose size is fixed and determined by the communications plan. The format of a transmission includes a slot header, which contains the following information:

Identification of the transmitting node.

A bit indicating whether this slot is assigned for RBS transmission by this node.

A number indicating the transmit needs of this node. The higher the transmit needs the more likely it is that a neighbor with an assigned but unused RBS slot will loan it to this node.

A bit map indicating which of the transmitting node's upcoming RBS slots will be used. Allocated but unused RBS slots can be loaned to a specific neighbor or yielded for contention.

The NSP of a neighbor node to which this node is loaning the unused RBS slots. If this node is not loaning its unused RBS slots, then the unused RBS slots are yielded for contention.

Number of entries in the Cell header array.

A Cyclic Redundancy Check (CRC) covering previous fields

The maximum number of cells that will fit in each transmission type is dependent on the data rate in effect for the intended slot. If while building a transmission of a certain type, there are not enough cells available for the primary use of the slot, cells of other types can be inserted to fill the transmission as long as the intended receiver(s) of the transmission match the intended receiver(s) of the cells. In particular, if a slot has been reserved and cells with the corresponding reservation ID have been exhausted, cells with no reservation ID can be inserted.

USAP

Reference has been made herein to the Unifying Slot Assignment Protocol (USAP). Briefly, USAP dynamically assigns TDMA (or ODMA) slots using information shared in bootstrap packets. The network uses USAP to allocate unicast and broadcast slots to support point-to-point and point-to-multipoint communications between neighboring nodes.

Figure 4:
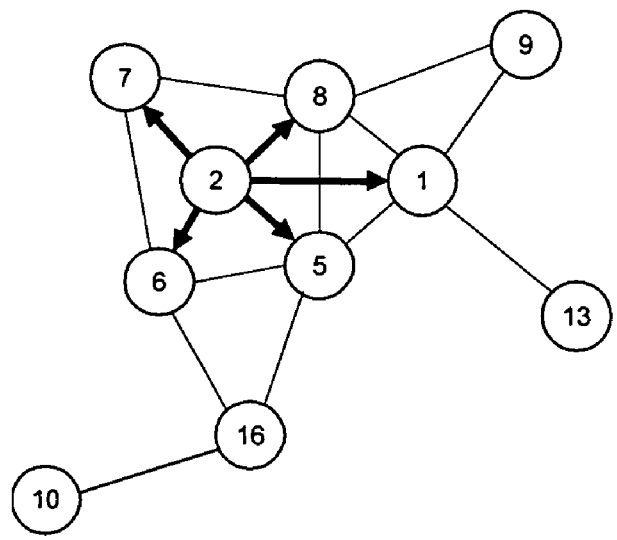
FIG. 4 is a schematic diagram of a communications network.
Figure 5:
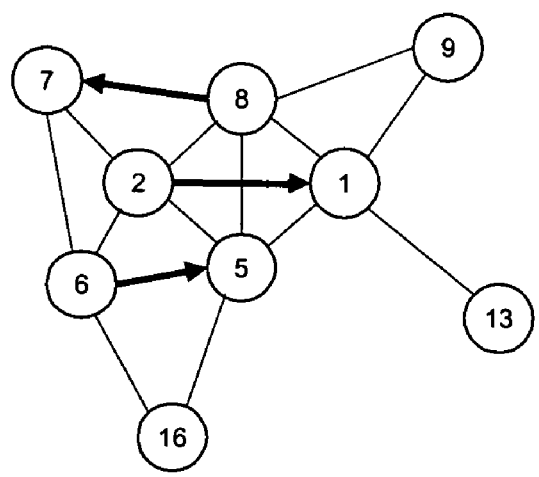
FIG. 5 is a schematic diagram of another communications network.

Traditionally, there are two methods in which a node transmits to its neighbors. The first, known as "node activation" or "broadcast", is shown in FIG. 4. Node activation has a transmitter, such as node 2, broadcast to all of its neighbors at once rather than individually. The second method, known as "link activation" or "unicast" and shown in FIG. 5, occurs when a transmitter such as node 2 intends to have only one receiver, such as node 1. Node activation allows only one active transmitter in a neighborhood, while link activation can potentially have several transmitters at a time in the same neighborhood.

USAP provides support for both broadcast and unicast. The broadcast assignment is used for Rotating Broadcast Slots. The unicast assignment is used for Fixed Reservation Slots to reserve capacity between two nodes on the same or different ODMA channels.

When a node chooses an allocation, USAP enforces constraints to avoid interference within 2 hops of the transmitting node. As used herein, "allocation" refers to an ordered pair of Radio Frequency (RF) channel and time slot. A node ensures that its allocations satisfy the USAP constraints by sharing the following slot sets with its neighbors:

$ST_i$—allocations where a node is transmitting $SR_i$—allocations where a node is receiving $NT_i$—allocations where a node's neighbors are transmitting These slot sets are transmitted in the bootstrap packets. This information, exchanged between neighboring nodes, is used by the USAP such that nodes may choose non-conflicting transmit allocations consistent with the most recent topology measurements and detect and report conflicts caused by topology changes.

The USAP information is exchanged in the two different kinds of bootstraps, namely, the CNi bootstrap (CNiB) and the Ni bootstrap (NiB). Although exact format of each of these is a function of the communications plan, the bootstrap nodes contain certain information as described herein. Furthermore, for an FRS, every member of the $ST_i$ or $SR_i$ set has a corresponding receiving id field to indicate the intended receiver. The receiving id will include bits to indicate which channel will be used. This should always be the receiver's DOCk except if the receiver has just moved to a different DOCk, in which case USAP will keep the FRSs on the original DOCk until they are released or a conflict is detected. To have enough USAP information to maintain the FRSs on the original DOCk, the receiver id and channel information shall be included in both the transmitter's and receiver's NiB.

To choose an FRS slot, a node first generates the set of slots that are not available because they are already in use locally. In the description that follows, the subscript of "i" denotes information about this node and "j" denotes the corresponding information reported by a neighboring node.

Slot Assignments:

S=set of slots

F=set of channels

Self Transmit/Receive Sets:

$STN_i(s,f)$=set of neighbors to which node i transmits on $(s,f)$ $SRN_i(s,f)$=set of neighbors from which node i receives on $(s,f)$ from which the following sets are derived:

$ST_i(s,f)$=set of allocations for which $STN_i(s,f)$ is not empty $SR_i(s,f)$=set of allocations for which $SRN_i(s,f)$ is not empty Neighbor Transmit/Receive Sets:

$ST_j(s,f)$=the $ST_i(s,f)$ reported by neighbor j $SR_j(s,f)$=the $SR_i(s,f)$ reported by neighbor j from which the following sets are derived:
NTi(s,f)=∪STj(s,f) over all neighbors j of node i
NRi(s,f)=∪SRj(s,f) over all neighbors j of node i
NTj(s,f)=the NTi(s,f) reported by neighbor j A node i or its neighbor j transmitting or receiving (on any channel) in slot s, is blocked from using slot s on any other ODMA channel. To this end the following derived sets are useful:
Bi(s)=STi(s,f)∪USRi(s,f) for any f
Bj(s)=STj(s,f)∪USRj(s,f) for any f
CoNRi(s)=∪SRj(s,f) for any f over all Co-sited neighbors j of node i To decide what slots and channels are available for FRS unicast allocation, a node i constructs the blocked allocations for transmitting to j by excluding allocations

| | |
|---|---|
| whose slot is already assigned to either node: | Bi(s)∪Bj(s) |
| i's co-sited neighbors are receiving in: | CoNRi(s) |
| i's neighbors are receiving in: | NRi(s,f) |
| j's neighbors are transmitting in: | NTj(s,f) |

This information is combined as follows:

$$Blocked(i, j, s, f) = Bi(s) \cup Bj(s) \cup CoNRi(s) \cup NRi(s, f) \cup NTj(s, f)$$
$$= \text{set of allocations where } i \text{ cannot transmit to } j$$

To decide what slots are available for FRS broadcast allocation on a particular channel f, a node i could construct the blocked allocations for transmitting to its neighbors on f by excluding allocations

| | |
|---|---|
| whose slot is already assigned to i: | Bi(s) |
| whose slot is already assigned to any of its neighbors on f: | $\cup_{\forall ne\{i's\_nbrs\}} Bj(s)$ |
| i's co-sited neighbors on any channel are receiving in: | CoNRi(s) |
| any of i's neighbors' neighbors on f are transmitting in: | $\cup_{\forall ne\{i's\_nbrs\}} NTj(s,f)$ |

This information is combined as follows:

$$Blocked(i, s, f) = Bi(s) \cup_{\forall n \in \{i's\_nbrs\}} Bj(s) CoNRi(s) \cup_{\forall n \in \{i's\_nbrs\}} NTj(s, f)$$
$$= \text{set of allocations where } i \text{ cannot transmit to its neighbors on } f$$

CNiB and RBS slots are allocated with 3-hop constraints if possible. This is illustrated in FIG. 4, in which node 9 would be permitted to use the same channel as node 10 because the nodes are more than three hops apart from each other.

To decide what slots are available for CNiB or RBS broadcast allocation on a particular channel f, a node i constructs the blocked allocations for transmitting to its neighbors on f.

To enforce 3-hop reuse a new set is defined:
NNTi(s)=∪SRj(s,f) over all neighbors j of node i on channel f by excluding allocations

| | |
|---|---|
| whose slot is already assigned to i or any of its neighbors: | $\cup_{\forall ne\{i's\_nbrs\}} Bj(s)$ |
| i's neighbors neighbors are transmitting in: | $\cup_{\forall ne\{i's\_nbrs\}} NNTj(s)$ |

This information is combined to identify allocations where i cannot transmit:

$$Blocked(i,s) = \cup_{\forall n \in \{i's\_nbrs\}} Bj(s) \cup_{\forall n \in \{i's\_nbrs\}} NNTj(s)$$

If all slots are blocked under 3-hop constraints the information can be combined to give 2-hop reuse:

$$Blocked(i,s) = \cup_{\forall n \in \{i's\_nbrs\}} Bj(s)$$

Yielding and Loaning RBS Slots

A node temporarily gives up the use of future allocated RBS slots when it does not have traffic to transmit. In its simplest form the node "yields" the slots for contention access by its neighbors. A node could "loan" the slots to a particular neighbor but this requires that the RBS slots satisfy 3-hop constraints like those of CNiB slots. A node that owns a 3-hop constrained RBS slot is able to loan it to a neighbor so that the latter can transmit in it without violating the 2-hop USAP constraints.

As previously discussed, the slot header includes a number to indicate how much traffic a node has to send (its transmit needs). A neighboring node that has an assigned RBS slot and has little traffic of its own could loan the slot to a neighbor with a high load. The slot header also includes a bit map indicating which reserved RBS slots will be used in the upcoming frame(s) and a field to specify the NSP of the neighbor that the slot is loaned to. If the NSP is NULL then the slots are yielded rather than loaned.

An RBS owner can continue to loan upcoming unused slots for as long as a neighbor indicates a need. If more than one neighbor indicates a high load then the owner of the RBS slot is the arbiter for loaning the slot, thereby eliminating contention for that slot.

A "fast mover" is a node that is moving so low and fast (such as a low-flying aircraft) that it does not have time to make reservations by the normal means. If it is on the same DOCk with the nodes that it is trying to communicate with, it can use contention CNiB and RBS slots to establish reserved communications quickly. If it does not have time to do even this, it can use the loaning and yielding mechanism to communicate, especially if nodes treat fast movers preferentially when loaning slots.

By using the mechanisms just described, a node in a network yields unused RBS slots or loans the slots to a particular neighbor. A node that has yielded or loaned an upcoming RBS slot does not transmit in the slot. This includes the case that traffic for transmission has arrived prior to the slot.

Advantaged Nodes

Figure 6:
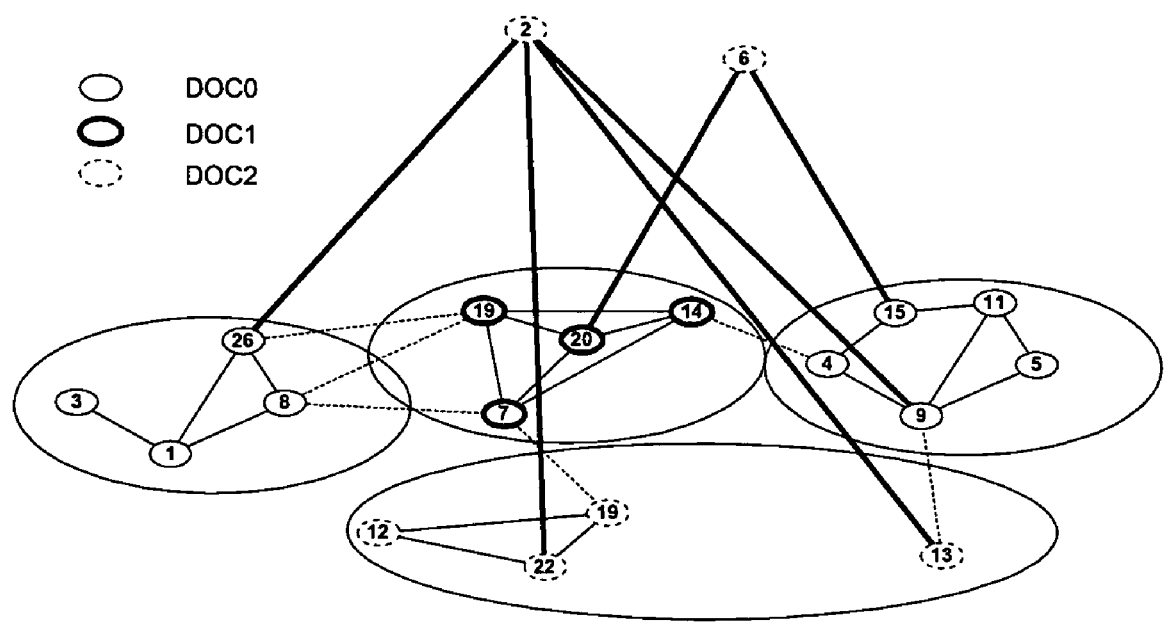
FIG. 6 is a schematic diagram of a communications network having advantaged nodes.

An advantaged node is one that can potentially communicate with a much larger section of the network than a non-advantaged node. In FIG. 6, nodes 2 and 6, which are part of DOC2, are advantaged nodes. Nodes 2 and 6 may be airborne or may be placed in an advantageous geographic location. It can be seen that nodes 2 and 6 can potentially communicate with nodes that would otherwise require several hops through the network. Advantaged nodes present both opportunities and challenges for the network management. Advantaged nodes can be exploited to perform as relays between nodes that might otherwise be many hops apart, thereby reducing the latency and increasing the reliability of their communications. On the other hand, if the special connectivity that advantaged nodes enjoy were published indiscriminately, it would make the section of the network they cover look like it was 2-hop, thereby severely constraining USAP in allocating slots to take advantage of spatial reuse.

If an advantaged node chooses to transmit a CNiB, it shall not advertise CNiB and RBS constraints other than those where it is the transmitter. This minimizes the detrimental effect on reuse that an advantaged node can have on nodes sharing its DOCk. It also means that transmissions to the advantaged node must be done via an FRS.

Since the advantaged node is advertising its FRS constraints in its NiB, a non-advantaged transmitter making an FRS reservation to an advantaged node makes the uplink FRS reservation on the advantaged node's DOCk. Likewise, because advantaged nodes can hear the NiBs from all non-advantaged nodes within range, they have the knowledge to make downlink reservations on the receiver's DOCk. This will constrain FRS assignments on this DOCk for all nodes visible to the advantaged node.

Advantaged nodes can share a DOCk with non-advantaged nodes, but there is a cost. When the advantaged node advertises the CNiB and RBS assignment constraints in its CNiB, it reduces reuse of these slots for non-advantaged nodes. However, these effects are limited to the DOCk that the advantaged node is on. Thus, the effects of advantaged nodes on reuse can be minimized by putting them on the same DOCk or at least on as few DOCks as possible. Alternatively, since the primary mode of linking advantaged nodes with non-advantaged nodes is via the FRS assignments, the advantaged nodes could avoid advertising CNiB and RBS constraints other than those where it is the transmitter. Indeed, the advantaged nodes may not even want to assign themselves a CNiB. The drawback to this is that the advantaged nodes themselves would only be able to transmit with low latency via FRS assignments.

Having pre-assigned NiB slots makes the detection of advantaged nodes possible. Because the preassigned NiB slots are contentionless, an advantaged node will detect all neighbors within the NiB cycle. A node suddenly detecting a lot of new neighbors may suspend advertising FRS reservations (in its NiB) or CNiB and RBS assignments (in its CNiB) until it is determined if this node is in fact an advantaged node. At that point the node can either start acting like an advantaged node with respect to advertising USAP constraints or not.

As described herein, the invention provides techniques for managing channel resources efficiently in both sparse and dense neighborhoods. An advantage of the invention is that it allows net entry by transmitting the information required to allow a new node to integrate itself into the TDMA structure on the proper ODMA channel. It also supports contention access for nodes that wish to utilize unreserved NiB, CNiB, and RBS slots. The full range of channel access from pure contention to pure TDMA is supported depending on how many nodes reserve CNiB and RBS slots. The contention access is enhanced by USAP constraints to reduce the chance of collisions, and this can be further enhanced by other known collision mitigation techniques.

Another advantage of the invention is that it supports efficient contention-less reserved communications between nodes on the same and different ODMA channels.

Another advantage is that decreased latencies can be achieved by assigning more slots and spacing the slots evenly in the TDMA frame.

Still another advantage is that advantaged nodes are accommodated and prevented from overly constraining the spatial reuse of non-advantaged nodes while allowing reservations to be set up to use the advantaged nodes as relays.

Another advantage is that special 3-hop rules regarding the reuse of dynamic channel resources are employed to promote network stability while allowing more reuse when they are in short supply.

Yet another advantage is that improved channel access performance can be achieved by loaning and yielding underutilized reserved slots to other nodes temporarily.

While the invention has been disclosed in its preferred form, the specific embodiments thereof as disclosed and illustrated herein are not to be considered in a limiting sense as numerous variations are possible. The subject matter of the invention includes all novel and non-obvious combinations and subcombinations of the various elements, features, functions and/or properties disclosed herein. No single feature, function, element or property of the disclosed embodiments is essential to all of the disclosed inventions. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the invention of the present disclosure.

What is claimed is:

1. A method of communicating over a network of nodes using a plurality of broadcast channels, each channel configured to facilitate the transmission and reception of data during cycles of time, the method comprising:
    dividing each cycle of time into discrete time frames;
    dividing each time frame into a plurality of slots;
    designating one of the plurality of broadcast channels as a common bootstrap channel;
    each node in the network configured to broadcast, to other nodes within one hop of said node, on the common bootstrap channel during a first bootstrap slot, slot assignment information relating to any broadcast channel;
    assigning each node to communicate over a broadcast channel that is one of the plurality of broadcast channels;
    each node broadcasting, on its assigned channel during a second dynamically assigned bootstrap slot, slot assignment information relating to the assigned broadcast channel only to other nodes within one hop of said node and on said assigned channel; and
    each node communicating according to the slot assignment information.

2. The method of claim 1, wherein slot assignment information for communication between nodes assigned to a broadcast channel changes in time during successive frames.

3. The method of claim 1, wherein slot assignment information for communication between nodes assigned to different channels is fixed in time during successive frames.

4. The method of claim 1, wherein the slot assignment information includes USAP protocols.

5. The method of claim 1, further including:
yielding a slot assignment of a first node to a second node if the first node does not have information to communicate, wherein the first and second nodes are within one hop of each other, and further wherein the second node communicates information during the slot assignment.

6. The method of claim 5, further including:
loaning a slot assignment of a first node to a second node if the second node does not have information to communicate, wherein the second node returns the slot assignment to the first node when the second node no longer needs to use the slot assignment.

7. The method of claim 6, further including:
identifying a node having movement characteristics that prevent said identified node from being assigned a time to broadcast; and
preferentially one of loaning and yielding a slot assignment to said identified node.

8. The method of claim 7, wherein the movement characteristics include speed of the node.

9. The method of claim 7, wherein the movement characteristics include altitude of the node.

10. The method of claim 1, further comprising:
identifying a node in the network having significantly more nodes within one hop of said node than substantially all of the other nodes in the network; and
selectively withholding information about the nodes within one hop of said identified node from the other nodes in the network during the first and second bootstrap slot allocations, thereby preventing the identified node from substantially limiting spatial reuse of slot assignments.

11. The method of claim 1, further including:
determining whether any slots within the frame are unassigned; and
allowing any of the nodes to contend for use of the unassigned slots.

12. A method of connecting communications nodes to a wireless communications network, comprising:
designating one of a plurality of communications channels as a common bootstrap channel;
each node in the network configured to broadcast, on the common bootstrap channel during a first time period, information to nodes, within one hop of said node, on any of the plurality of communications channels;
assigning each node to communicate over a communications channel that is one of the plurality of communications channels;
each node broadcasting, on its assigned channel during an allocation in a second time period, slot assignment information relating to the assigned broadcast channel to other nodes that are also assigned to said assigned broadcast channel and that are within one hop of said node; and
each node communicating on its assigned channel according to the slot assignment information.

13. The method of claim 12, further including:
establishing a plurality of frames within a repeating time cycle;
defining a plurality of slots within each frame;
wherein the first time period is comprised of a portion of the plurality of slots that are dedicated principally for the communication of nodes on the common bootstrap channel.

14. The method of claim 13, wherein slot assignment information for communication between nodes assigned to a first channel changes in time during successive frames.

15. The method of claim 13, wherein slot assignment information for communication between nodes assigned to different channels is fixed in time during successive frames.

16. The method of claim 12, wherein the slot assignment information includes USAP protocols.

17. The method of claim 12, further including:
yielding a slot assignment of a first node to a second node if the first node does not have information to communicate, wherein the first and second nodes are within one hop of each other, and further wherein the second node communicates information during the slot assignment.

18. The method of claim 17, further including:
loaning a slot assignment of a first node to a second node if the second node does not have information to communicate, wherein the second node returns the slot assignment to the first node when the second node no longer needs to use the slot assignment.

19. The method of claim 18, further including:
identifying a node having movement characteristics that prevent said identified node from being assigned a time to broadcast; and
preferentially one of loaning and yielding a slot assignment to said identified node.

20. A wireless communications network, comprising:
a plurality of TDMA communications channels, wherein one of the channels is a common channel;
a plurality of nodes, each node being assigned to one of the channels;
a repeating time cycle divided into a plurality of frames;
a first plurality of bootstrap slots for communicating on the common channel, wherein all of the plurality of nodes receive slot allocation information therefrom; and
a second plurality of bootstrap slots, distributed across all the channels, wherein each node receives slot allocation information from other nodes that are within one hop of said node and on the same assigned channel.

* * * * *